(12) United States Patent
Fujioka

(10) Patent No.: US 6,578,249 B2
(45) Date of Patent: Jun. 17, 2003

(54) PROCESS FOR ASSEMBLING BELT FOR CONTINUOUSLY VARIABLE TRANSMISSION

(75) Inventor: Hiroshi Fujioka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/920,329

(22) Filed: Aug. 2, 2001

(65) Prior Publication Data
US 2002/0025871 A1 Feb. 28, 2002

(30) Foreign Application Priority Data
Aug. 3, 2000 (JP) .......................... 2000-235325

(51) Int. Cl.[7] ............................................. B23P 11/00
(52) U.S. Cl. ........................... 29/434; 29/428; 474/242
(58) Field of Search ................... 29/434, 428; 474/201, 474/242

(56) References Cited

U.S. PATENT DOCUMENTS

| | | | | |
|---|---|---|---|---|
| 4,533,342 A | * | 8/1985 | Miranti, Jr. et al. | 474/201 |
| 4,610,648 A | * | 9/1986 | Miranti, Jr. | 474/242 |
| 4,617,007 A | * | 10/1986 | Miranti, Jr. et al. | 474/201 |
| 4,676,768 A | * | 6/1987 | Miranti, Jr. et al. | 474/201 |
| 4,692,985 A | * | 9/1987 | Van Dijk | 29/450 |
| 4,794,741 A | * | 1/1989 | van Dijk | 451/82 |
| 4,824,424 A | * | 4/1989 | Ide et al. | 474/242 |
| 5,004,450 A | * | 4/1991 | Ide | 474/242 |
| 5,439,422 A | * | 8/1995 | Smeets | 474/242 |
| 5,533,940 A | * | 7/1996 | Smeets | 474/242 |
| 6,074,317 A | * | 6/2000 | Kobayashi | 474/201 |
| 6,217,472 B1 | * | 4/2001 | Fujioka et al. | 474/242 |
| 6,238,313 B1 | * | 5/2001 | Smeets et al. | 474/244 |
| 6,270,437 B1 | * | 8/2001 | Yoshida et al. | 474/248 |
| 6,293,886 B1 | * | 9/2001 | Ohkawa et al. | 474/242 |
| 6,334,830 B1 | * | 1/2002 | Yagasaki et al. | 474/242 |
| 6,342,020 B1 | * | 1/2002 | Aoyama | 474/242 |

FOREIGN PATENT DOCUMENTS

| | | | |
|---|---|---|---|
| EP | 0 279 473 A1 | 8/1988 | |
| EP | 0 305 023 A1 | 3/1989 | |
| JP | 61-103651 | 12/1984 | ............ F16G/5/16 |
| JP | 61-103651 | 1/1986 | |

OTHER PUBLICATIONS

European Search Report EP 01 11 8921, Nov. 16, 2001.

* cited by examiner

Primary Examiner—Gregory Vidovich
Assistant Examiner—Essama Omgba
(74) Attorney, Agent, or Firm—Arent Fox Kintner Plotkin & Kahn

(57) ABSTRACT

A process for assembling a belt for a continuously variable transmission, comprising the following steps: preparing standard elements, first adjusting elements and second adjusting elements respectively having a thickness of 1.5 mm, 1.6 mm and 1.4 mm; measuring an initial clearance $\alpha i$ generated upon closely assembling only the standard elements to a metal ring assembly; if the initial clearance $\alpha i < 0.8$ mm, using a predetermined number of the first adjusting elements, thereby making a clearance between the elements smaller than 0.1 mm; if the initial clearance $\alpha i \geq 0.8$ mm, using a predetermined number of the second adjusting elements, thereby making the clearance between the elements smaller than 0.1 mm. Thus, the number of the adjusting elements required for adjusting the clearance between the elements can be suppressed to seven or less.

2 Claims, 7 Drawing Sheets

PROCESS FOR ASSEMBLING BELT FOR CONTINUOUSLY VARIABLE TRANSMISSION

BACKGROUND OF THE INVENTION

1. Field of the Invention

The present invention relates to a process for assembling a belt for a continuously variable transmission by assembling a large number of metal elements along a metal ring assembly comprised of a plurality of endless metal rings laminated one on another.

2. Description of the Related Art

The belt for the continuously variable transmission is constructed by assembling a large number of metal elements along a metal ring assembly. However, each of the metal elements is produced by finely blanking a metal plate and for this reason, a dimensional variation is unavoidably generated in thickness of the metal element for every lot, and a dimensional variation is also unavoidably generated in peripheral length of the metal ring assembly. Therefore, the following problem is encountered: When a predetermined number of the metal elements are assembled to the metal ring assembly, the variations in thickness of the large number of metal elements are accumulated, whereby the metal ring assembly becomes relatively too long and a large clearance incapable of being disregarded for the durability of the belt for the continuously variable transmission is generated between the metal elements after completion of the assembling; or the metal ring assembly becomes relatively too short, only a number of the metal element one smaller than the predetermined number is assembled and as a result, a large clearance incapable of being disregarded is generated between the metal elements.

Therefore, Japanese Utility Model Application Laid-open No. 61-103651 discloses a technique in which standard elements having a standard thickness are combined among a predetermined number of adjusting elements having a thickness slightly larger than that of the standard elements, thereby decreasing the clearance between the elements.

To assemble the belt for the continuously variable transmission by combining the adjusting elements among the standard elements, the standard elements as many as possible are first assembled to the metal ring assembly; an initial clearance defined between the rearwardmost and forwardmost ones of the standard elements is measured, and the number of the adjusting elements required is determined in accordance with the initial clearance. To assemble the number of the adjusting elements required, a predetermined number of the standard elements already assembled are removed from the metal ring assembly, and in place of them, the adjusting elements are assembled.

From the forgoing, there is encountered a problem; if the number of the adjusting elements required is increased, the number of the standard elements removed after being once assembled to the metal ring assembly is also increased, resulting in an increased number of operating steps. In addition, since the standard elements and the adjusting elements are different in thickness from each other and, for example, a dimensional variation unavoidably exists between heights of saddle faces with which the metal ring contacts, there is a possibility that the durability of the belt for the continuously variable transmission is adversely affected by a load applied to the metal ring assembly by the metal element whose saddle faces protrude. Therefore, it is desirable to minimize the number of the adjusting elements to be combined among the standard elements.

FIG. 6 is a graph showing how many adjusting elements having a thickness of 1.6 mm are required for compensating for the initial clearance $\alpha i$ generated when standard elements having a standard thickness t of 1.5 mm are used. In this case, $\Delta t$ which is a difference between the standard thickness t=1.5 mm of the standard elements and the thickness 1.6 mm of the adjusting elements, is 0.1 mm.

The case where the initial clearance $\alpha i$ is equal to 0.0 mm is an ideal state in which only the standard elements are used without using the adjusting elements, resulting in no clearance $\alpha$ generated between the elements. If 0.0 mm<$\alpha i$<0.1 mm, it is impossible to compensate for the initial clearance $\alpha i$ by the adjusting elements, and only the standard elements are used. However, the clearance $\alpha$ between the elements is such small as 0.1 mm or less, and there is no particular hindrance in practical use. From the forgoing, if 0.0 mm$\leq \alpha i$<0.1 mm, the number of the adjusting elements required is 0 (zero).

If 0.1 mm$\leq \alpha i$<0.2 mm, the clearance $\alpha$ between the elements can be suppressed to 0.0 mm or more and less than 0.1 mm by using one adjusting element, and if 0.2 mm$\leq \alpha i$<0.3 mm, the clearance $\alpha$ between the elements can be suppressed to 0.0 mm or more and less than 0.1 mm by using two adjusting elements. Likewise, whenever the initial clearance $\alpha i$ is increased by 0.1 mm, the number of the adjusting elements required is increased one by one, and finally, if 1.4 mm$\leq \alpha i$<1.5 mm, the clearance $\alpha$ between the elements can be suppressed to 0.0 mm or more and less than 0.1 mm by using fourteen adjusting elements. Therefore, it is understood that when only the adjusting elements having a thickness of 1.6 mm are used, average seven adjusting elements are required to suppress the clearance $\alpha$ between the elements to less than 0.1 mm.

FIG. 7 is a graph showing how many adjusting elements having a thickness of 1.4 mm are required to compensate for the initial clearance $\alpha i$ generated when standard elements having a standard thickness t of 1.5 mm are used. In this case, $\Delta t$ which is a difference between the standard thickness t=1.5 mm of the standard elements and the thickness 1.4 mm of the adjusting elements, is 0.1 mm.

The case where the initial clearance $\alpha i$ is equal to 1.5 mm in an ideal state in which only the standard elements are used without using the adjusting elements, resulting in no clearance $\alpha$ generated between the elements. If 1.4 mm<$\alpha i$<1.5 mm, the clearance $\alpha$ between the elements can be suppressed to 0.0 mm or more and less than 0.1 mm by using one adjusting element, and if 1.3 mm$\leq \alpha i$<1.4 mm, the clearance $\alpha$ between the elements can be suppressed to 0.0 mm or more and less than 0.1 mm by using two adjusting elements. Likewise, whenever the initial clearance $\alpha i$ is decreased by 0.1 mm, the number of the adjusting elements required is increased one by one, and finally, if 0.0 mm$\leq \alpha i$<0.1 mm, the clearance $\alpha$ between the elements can be suppressed to less than 0.1 mm by using fifteen adjusting elements. If $\alpha i$=0.0 mm, since the clearance $\alpha$ between the elements can be suppressed to 0.1 mm by using only the standard elements, the second adjusting element $32b$ is not required. Therefore, it is understood that when only adjusting elements having a thickness of 1.4 mm are used, average eight adjusting elements are required to suppress the clearance $\alpha$ between the elements to less than 0.1 mm.

The present invention has been accomplished with the above circumstance in view, and it is an object of the present invention to decrease the number of the adjusting elements required for suppressing the clearance between the elements for the belt for the continuously variable transmission to a predetermined value or less.

SUMMARY OF THE INVENTION

To achieve the above object, according to a first feature of the present invention, there is provided a process for assembling a belt for a continuously variable transmission by assembling a large number of metal elements along a metal ring assembly comprised of a plurality of endless metal rings laminated one on another. The process comprises the steps of preparing, as the metal elements, standard elements having a standard thickness t, first adjusting elements having a thickness larger than the standard thickness t by a predetermined value $\Delta t$, and second adjusting elements having a thickness smaller than the standard thickness t by a predetermined value $\Delta t$; assembling only the standard elements closely on the metal ring assembly, and defining, as an initial clearance $\alpha i$, a clearance $\alpha$ generated between the rearwardmost and forwardmost ones of the standard elements, when the number of standard elements assembled has reached the maximum; if the initial clearance $\alpha i$ is smaller than approximately one half of said standard thickness t, combining a predetermined number of said first adjusting elements among said standard elements, thereby making the clearance $\alpha$ after completion of the assembling to smaller than said predetermined value t; or if the initial clearance $\alpha i$ is equal to or larger than approximately one half of said standard thickness t, combining a predetermined number of said second adjusting elements with said standard elements to assemble them, thereby making the clearance $\alpha$ after completion of the assembling to smaller than said predetermined value t.

With the above feature, the first adjusting elements thicker than the standard elements having the standard thickness t by the predetermined value $\Delta t$ and the second adjusting elements thinner than the standard elements having the standard thickness t by the predetermined value $\Delta t$ are prepared, a predetermined number of the first adjusting elements or the second adjusting elements are combined among the standard elements, depending on whether the initial clearance $\alpha i$ is smaller than, or equal to or larger than substantially one half of the standard thickness t, thereby suppressing the clearance $\alpha$ between the elements after completion of the assembling to smaller than the predetermined value $\Delta t$. Therefore, the number of the adjusting elements required can be reduced to about one half, as compared with a case where only the first adjusting elements or the second adjusting elements are used to achieve the adjustment irrespective of the initial clearance $\alpha i$.

As a result, it is possible to reduce the number of operating steps for replacing the already assembled standard elements by the adjusting elements after measurement of the initial clearance $\alpha i$. Moreover, even when a difference in height level exists between saddle faces of the standard element and the adjusting element, a load acting on the metal ring assembly due to the difference in height level can be minimized, to thereby enhance the durability of the belt for the continuously variable transmission.

According to a second feature of the present invention, in addition to the first feature, if $\Delta t \leq \alpha i < (t+\Delta t)/2$, the predetermined number of the first adjusting elements are combined among the standard elements, or if $(t+\Delta t)/2 \leq \alpha i < t$, the predetermined number of the second adjusting elements are combined among the standard elements.

With the above feature, if $\Delta t \leq \alpha i < (t+\Delta t)/2$, the first adjusting elements are used, or if $(t+\Delta t)/2 \leq \alpha i < t$, the second adjusting elements are used. Therefore, it is possible to minimize the number of the second adjusting elements required when the initial clearance $\alpha i$ is approximately one half of the standard thickness t.

DESCRIPTION OF THE PREFERRED EMBODIMENT

The mode for carrying out the present invention will now be described by way of embodiment of the present invention shown in the accompanying drawings.

FIGS. 1 to 5 show an embodiment of the present invention.

Figure 1:
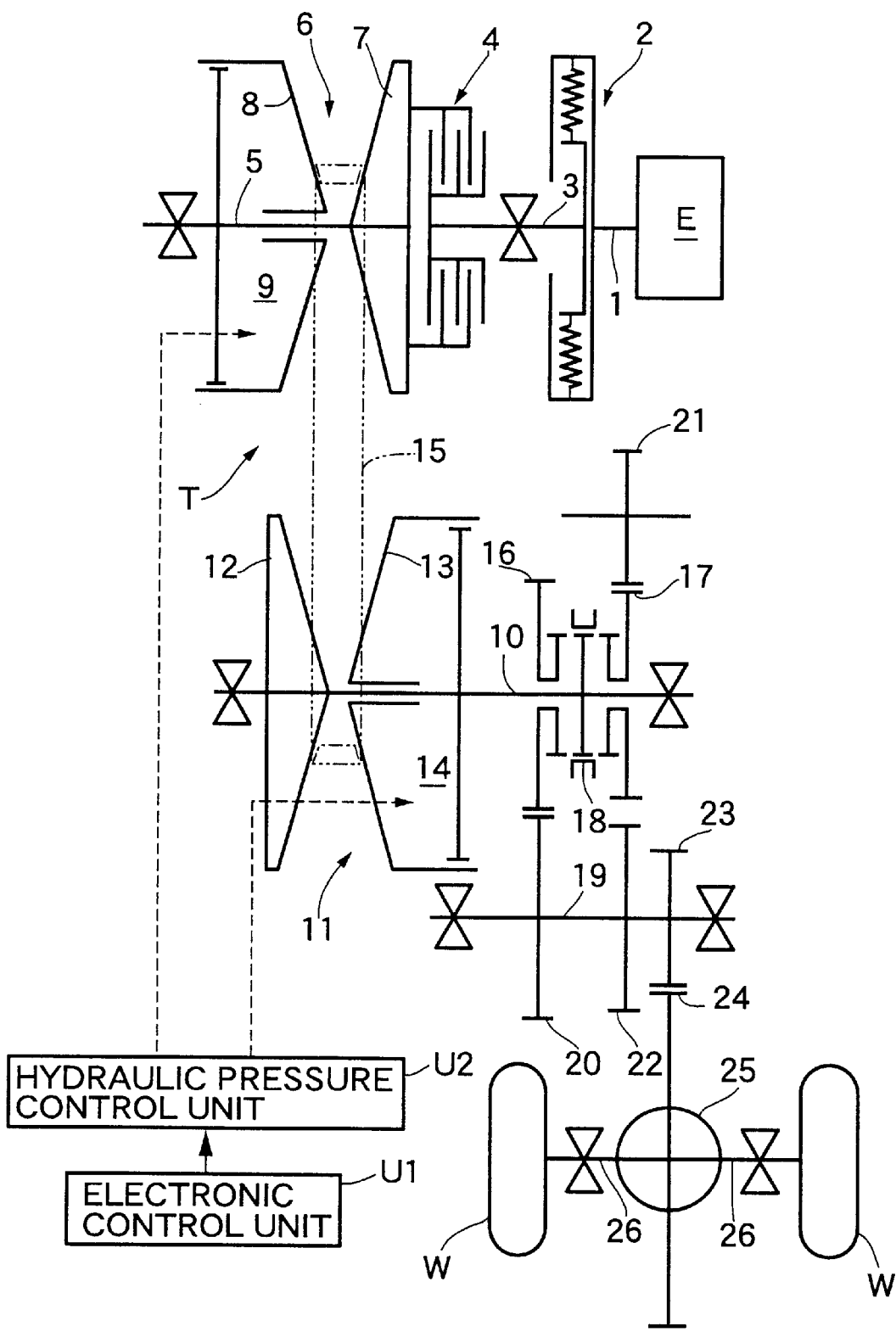
FIG. 1 is a skeleton illustration of a power transmitting system for a vehicle equipped with a continuously variable transmission.

FIG. 1 schematically shows the structure of a metal belt type continuously variable transmission T mounted on an automobile. An input shaft 3 connected to a crankshaft 1 of an engine E through a damper 2 is connected to a driving shaft 5 of the metal belt type continuously variable transmission T through a starting clutch 4. A drive pulley 6 provided on the driving shaft 5 comprises a stationary pulley half 7 secured to the driving shaft 5, and a movable pulley half 8 capable of moving toward and away from the stationary pulley half 7. The movable pulley half 8 is forced toward the stationary pulley half 7 by a hydraulic pressure applied to an oil chamber 9.

A driven pulley 11 is provided on a driven shaft 10 disposed in parallel to the driving shaft 5, and comprises a stationary pulley half 12 secured to the driven shaft 10, and a movable pulley half 13 capable of moving toward and away from the stationary pulley half 12. The movable pulley half 13 is forced toward the stationary pulley half 12 by a hydraulic pressure applied to an oil chamber 14. A metal belt 15 is wound around the drive pulley 6 and the driven pulley 11, and comprises a large number of metal elements 32 supported on a pair of left and right metal ring assemblies 31, 31 (see FIG. 2). Each of the metal ring assemblies 31, 31 comprises, for example, 12 metal rings 33 which are laminated on one another.

A forward drive gear 16 and a backward drive gear 17 are relatively rotatably supported on the driven shaft 10. The forward drive gear 16 and the backward drive gear 17 can be coupled selectively to the driven shaft 10 by a selector 18. A forward driven gear 20 meshed with the forward drive gear 16 and a backward driven gear 22 meshed with the backward drive gear 17 through a backward idling gear 21 are secured to an output shaft 19 which is disposed in parallel to the driven shaft 10.

The rotation of the output shaft 19 is input to a differential 25 through a final drive gear 23 and a final driven gear 24, and is transmitted therefrom through left and right axles 26, 26 to driven wheels W, W.

A driving force of the engine E is transmitted to the driven shaft 10 through the crankshaft 1, the damper 2, the input shaft 3, the start clutch 4, the drive shaft 5, the driven pulley 6, the metal belt 15 and the driven pulley 11. When a forward travel range is selected, the driving force of the driven shaft 10 is transmitted to the output shaft 19 through the forward drive gear 16 and the forward driven gear 20, thereby allowing the vehicle to travel forwards. When a backward travel range is selected, the driving force of the driven shaft 10 is transmitted to the output shaft 19 through the backward drive gear 17, the backward idling gear 21 and the backward driven gear 22, thereby allowing the vehicle to travel backwards.

In this metal belt type continuously variable transmission T, hydraulic pressures applied to the oil chamber 9 of the drive pulley 6 and the oil chamber 14 of the driven pulley 11 are controlled by a hydraulic pressure control unit U2 which is operated by a command from an electronic control unit U1, thereby continuously adjusting the change gear ratio. Specifically, if a hydraulic pressure applied to the oil chamber 14 of the driven pulley 11 is increased relative to a hydraulic pressure applied to the oil chamber 9 of the drive pulley 6, the grove width of the driven pulley 11 is reduced, leading to an increased effective radius, and correspondingly, the groove width of the drive pulley 6 is increased, leading to a reduced effective radius. Therefore, the change gear ratio of the metal belt type continuous variable transmission T is continuously varied toward "LOW". On the other hand, if the hydraulic pressure applied to the oil chamber 9 of the drive pulley 6 is increased relative to the hydraulic pressure applied to the oil chamber 14 of the driven pulley 11, the groove width of the drive pulley 6 is reduced, leading to an increased effective radius, and correspondingly, the groove width of the driven pulley 11 is increased, leading to a reduced effective radius. Therefore, the change gear ratio of the metal belt type continuous variable transmission T is continuously varied toward "TOP".

Figure 2:
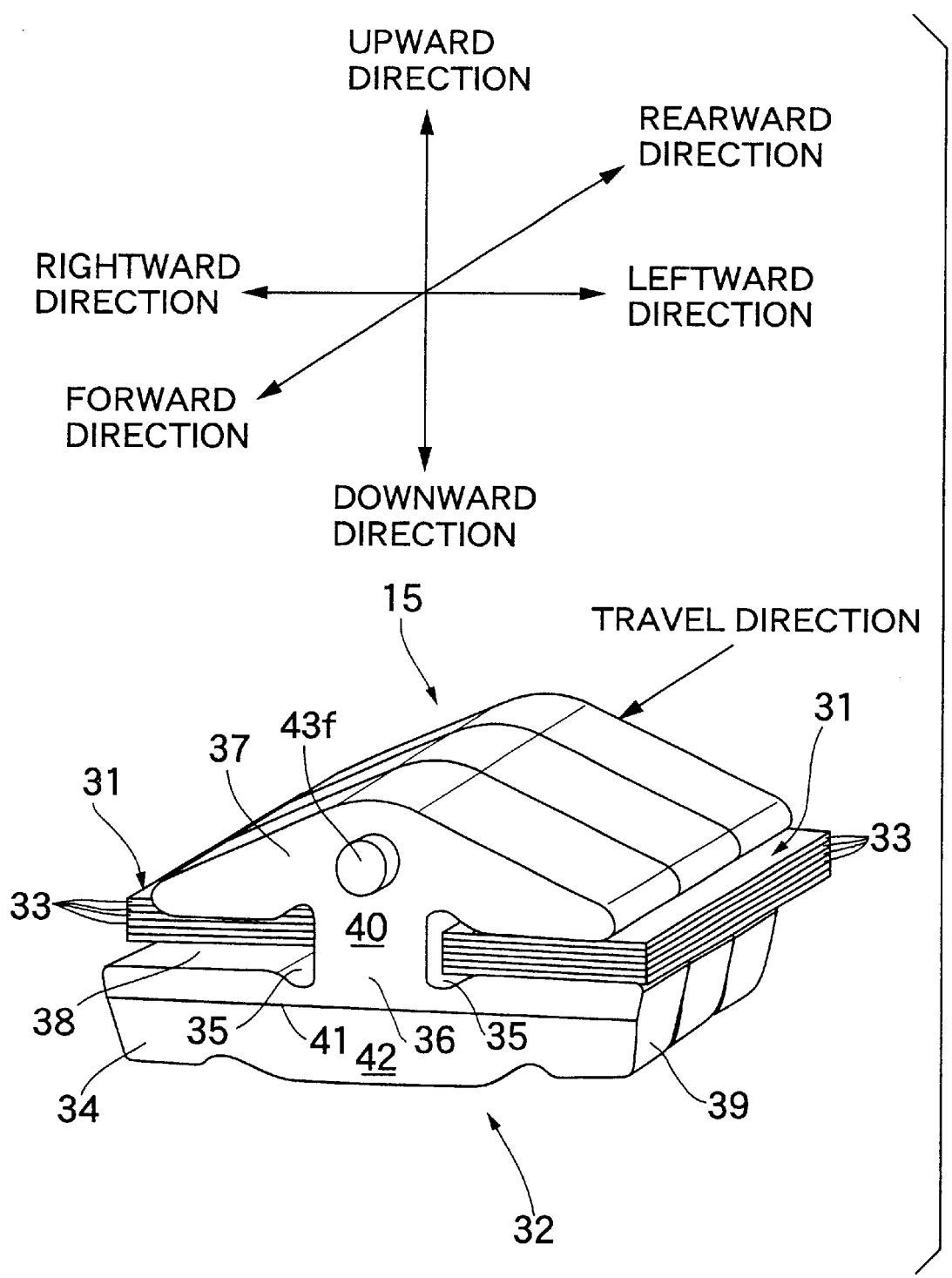
FIG. 2 is a partial perspective view of a metal belt.

As shown in FIG. 2, each of the metal elements 32 (standard elements 32) formed from a metal plate by punching, includes a substantially trapezoidal element body 34, a neck 36 located between a pair of left and right ring slots 35, 35 into which the metal ring assemblies 31, 31 are fitted, and a substantially triangular ear 37 connected to an upper portion of the element body 34 through the neck 36. The innermost metal rings 33 of the metal ring assemblies 31, 31 are supported on saddle faces 38, 38 facing the ring slots 35, 35, respectively. Formed on the laterally opposite ends of the element body 34 is a pair of pulley abutment faces 39, 39 capable of abutting against V-faces of the drive pulley 6 and the driven pulley 11. Formed on the front and rear portions of the metal element 32 is a pair of front and rear main surfaces 40, 40 which are perpendicular to the travel direction and parallel to each other. An inclined face 42 is formed below the front main surface 40 with a laterally extending locking edge 41 located therebetween. Further, formed on the front and rear surfaces of the ear 37 are a projection 43f and a recess 43r (see FIG. 3) for connecting the metal elements 32, 32 in the forward and backward directions.

In the present embodiment, a standard thickness t of the metal element 32 (the standard element 32) is set at 1.5 mm.

Figure 3:
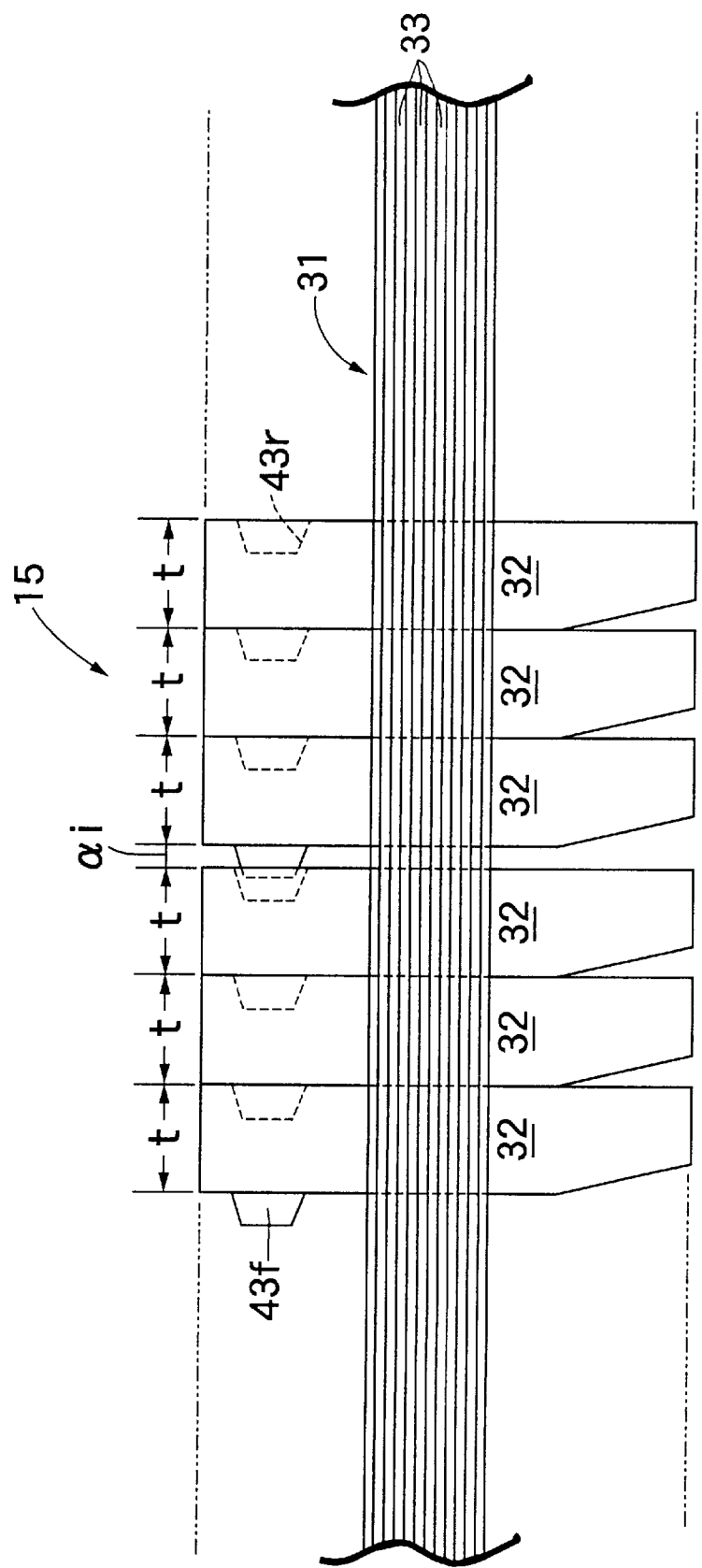
FIG. 3 is a partial side view of the metal belt before regulation of a clearance.

FIG. 3 shows a large number of the standard elements 32 in a state in which they have been closely assembled as many as possible to the metal ring assemblies 31, 31 with an initial clearance $\alpha i$ defined between the rearwardmost and forwardmost standard elements 32. The size of the initial clearance $\alpha i$ can be set at 0.0 mm from the viewpoint of design, but in fact, it is rare that the initial clearance assumes 0.0 mm, because generation of a variation in thickness of the standard elements 32 and a variation in peripheral length of the metal ring assemblies 31, 31 are unavoidable. In a usual case, an initial clearance $\alpha i$ smaller than the standard thickness t (1.5 mm or less) of the standard element 32 is generated.

In the present embodiment, by using first adjusting elements 32a having a thickness of 1.6 mm larger than that of the standard elements 32 by a predetermined value $\Delta t$ (for example, 0.1 mm) and second adjusting elements 32b having a thickness of 1.4 mm smaller than that of the standard elements 32 by the predetermined value $\Delta t$ (for example, 0.1 mm), the clearance $\alpha$ (see FIG. 4) between the elements after completion of the assembling is suppressed to smaller than the predetermined value $\Delta t$.

Figure 5:
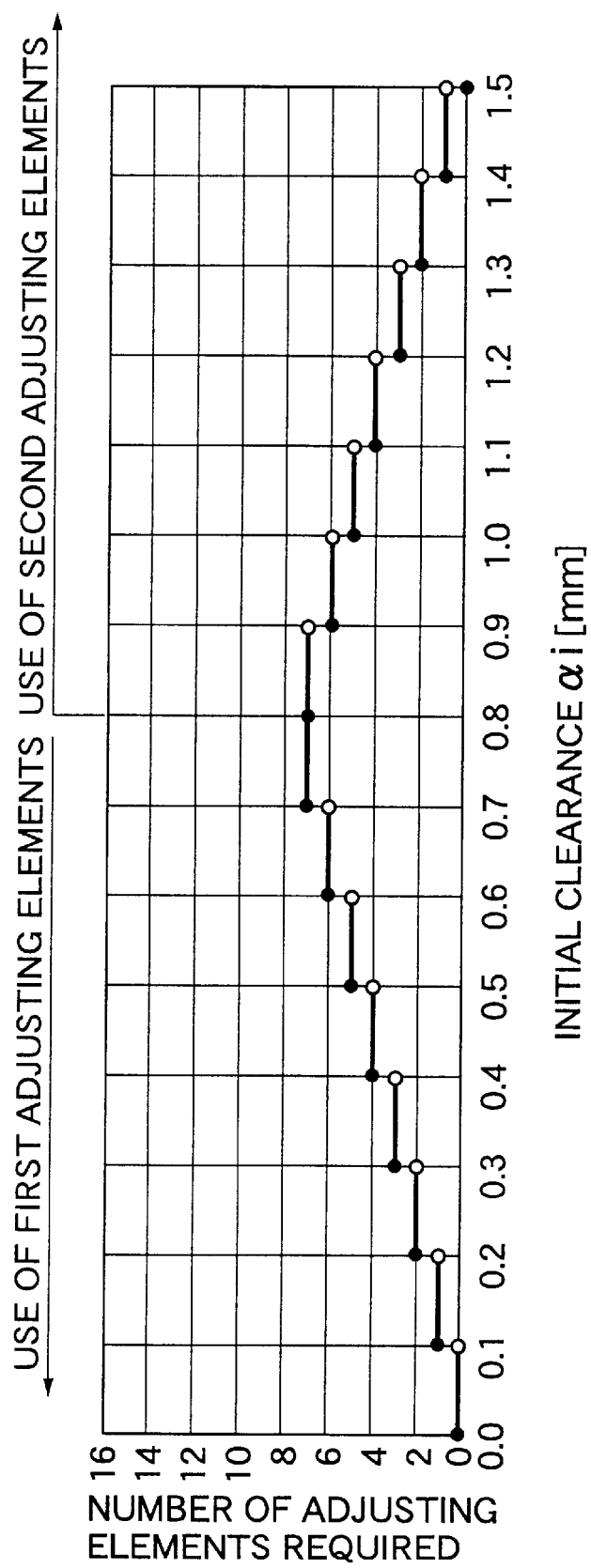
FIG. 5 is a graph showing the relationship between the initial clearance and the number of regulating elements required (when both first and second adjusting elements are used).

As shown in FIG. 5, if the initial clearance $\alpha i$ is smaller than 0.8 mm, namely, smaller than $(t+\Delta t)/2$, the clearance $\alpha$ between the elements can be suppressed to smaller than the predetermined value $\Delta t$ equal to 0.1 mm by combining at least one or at most seven first adjusting elements 32a having the thickness of 1.6 mm among the standard elements 32.

Figure 4:
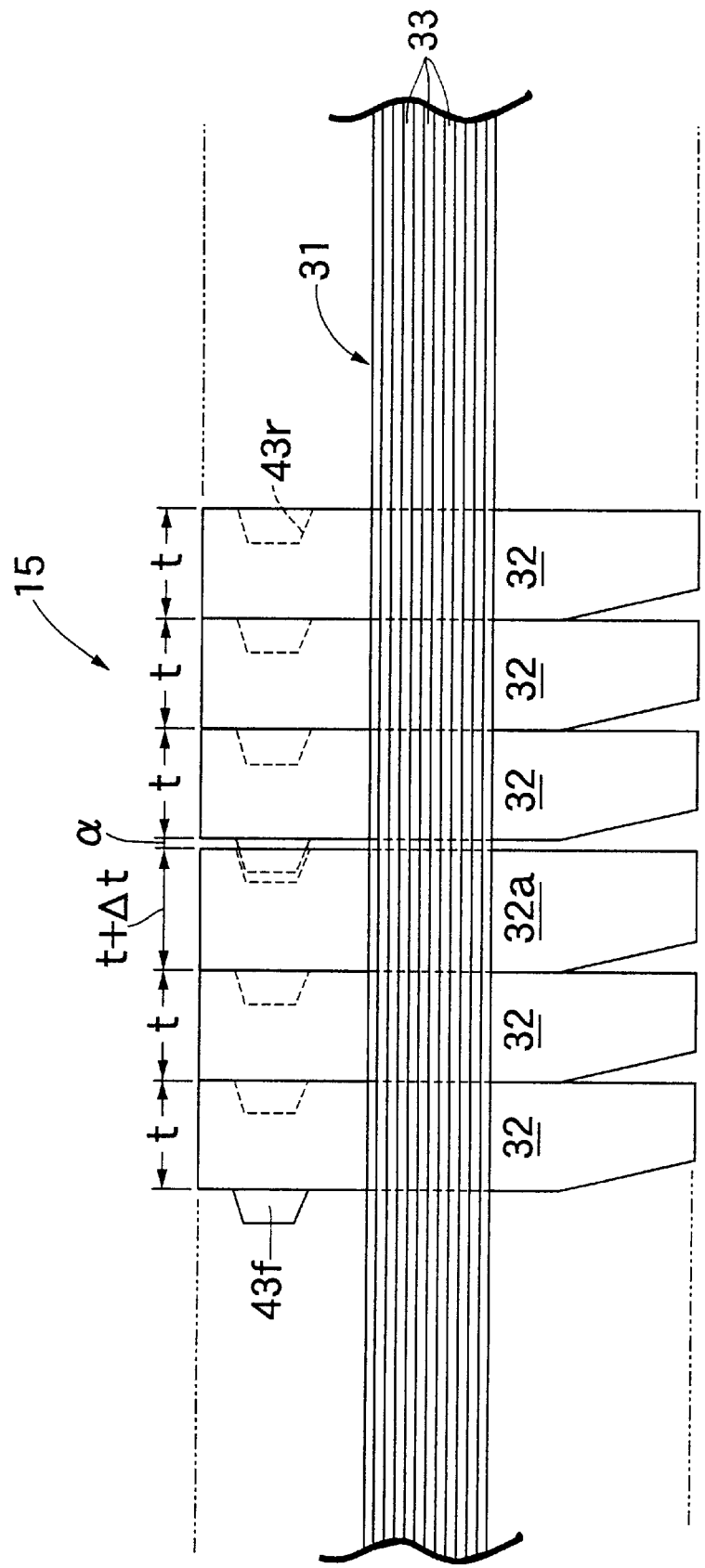
FIG. 4 is a partial side view of the metal belt after regulation of the clearance.

More specifically, by using one first adjusting elements 32a in the case of $0.1 \text{ mm} \leq \alpha i < 0.2$ mm: two in the case of $0.2 \text{ mm} \leq \alpha i < 0.3$ mm; three in the case of $0.3 \text{ mm} \leq \alpha i < 0.4$ mm; four in the case of $0.4 \text{ mm} \leq \alpha i < 0.5$ mm; five in the case of $0.5 \text{ mm} \leq \alpha i < 0.6$ mm; six in the case of $0.6 \text{ mm} \leq \alpha i < 0.7$ mm; and seven in the case of $0.7 \text{ mm} \leq \alpha i < 0.8$ mm, the clearance $\alpha$ between the elements can be suppressed to smaller than the predetermined value $\Delta t$ equal to 0.1 mm. FIG. 4 shows a state in which the clearance between the elements has been suppressed to smaller than the predetermined value $\Delta t$ equal to 0.1 mm by using one first adjusting element 32a. If $0.0 \text{ mm} \leq \alpha i < 0.1$ mm, the first adjusting element 32a cannot be mounted, but the initial clearance $\alpha i$ is the clearance $\alpha$, as it is, and there is particularly no problem since the clearance $\alpha$ between the elements is smaller than the predetermined value $\Delta t$ equal to 0.1 mm.

On the other hand, if the initial clearance $\alpha i$ is equal to or larger than 0.8 mm, namely, equal to or larger than $(t+\Delta t)/2$, the clearance $\alpha$ between the elements can be suppressed to smaller than the predetermined value $\Delta t$ equal to 0.1 mm by combining at least one or at most seven second adjusting elements 32b having a thickness of 1.4 mm among the standard elements 32.

More specifically, by using one second adjusting elements 32b in the case of $1.4 \text{ mm} \leq \alpha i < 1.5$ mm; two in the case of $1.3 \text{ mm} \leq \alpha i < 1.4$ mm; three in the case of $1.2 \text{ mm} \leq \alpha i < 1.3$ mm; four in the case of $1.1 \text{ mm} \leq \alpha i < 1.2$ mm; five in the case of $1.0 \text{ mm} \leq \alpha i < 1.1$ mm; six in the case of $0.9 \text{ mm} \leq \alpha i < 1.0$ mm; and seven in the case of $0.8 \text{ mm} \leq \alpha i < 0.9$ mm, the clearance $\alpha$ between the elements can be suppressed to smaller than the predetermined value $\Delta t$ equal to 0.1 mm.

If the first adjusting elements 32a are used to adjust the clearance $\alpha$ between the elements, the average number of the elements 32a required is 3.5 which is the average from 0 to seven, and if the second adjusting elements 32b are used to adjust the clearance $\alpha$ between the elements, the average number of the elements 32b required is 4 which is the average from 0 to seven.

Figure 6:
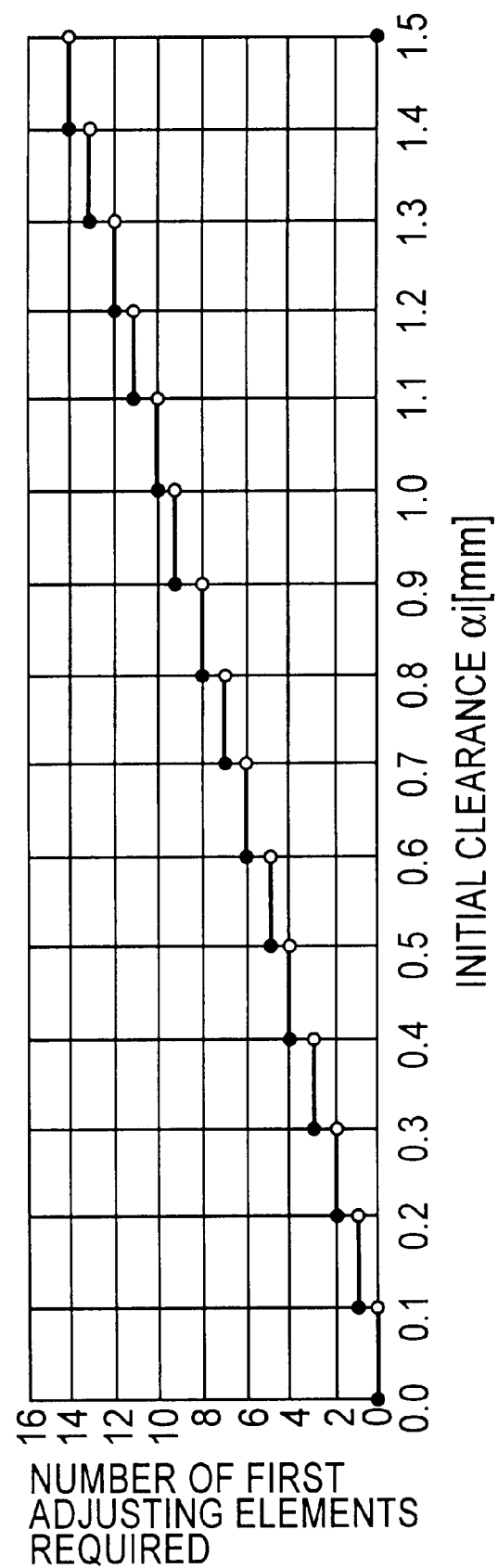
FIG. 6 is a graph showing the relationship between the initial clearance and the number of regulating elements required (when only first adjusting elements are used).
Figure 7:
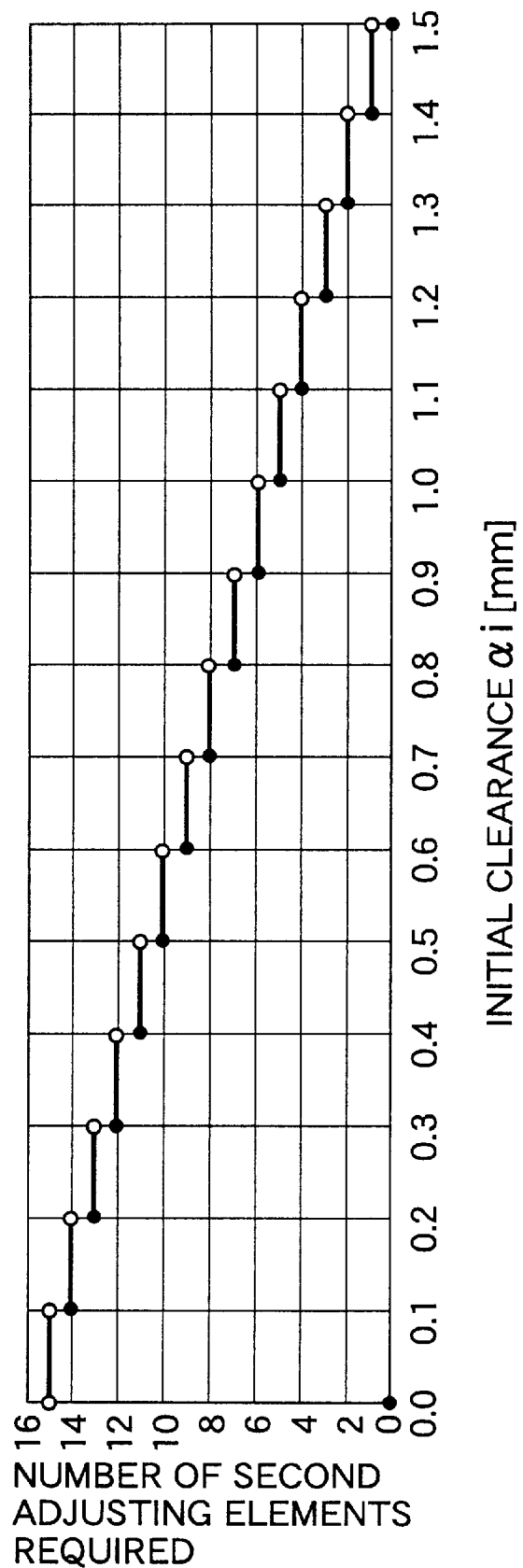
FIG. 7 is a graph showing the relationship between the initial clearance and the number of regulating elements required (when only second adjusting elements are used).

As described above, supposing that $(t+\Delta t)/2=8$ is defined as a threshold value, the clearance $\alpha$ between the elements can be suppressed to smaller than the predetermined value $\Delta t$ equal to 0/1 mm by using seven or less first adjusting elements 32a if the initial clearance αi is smaller than the threshold value, or by using seven or less second adjusting elements 32b if the initial clearance αi is equal to or larger than the threshold value. Moreover, the numbers of the first adjusting elements 32a required and the second adjusting elements 32b required can be reduced to about one half of the numbers in the prior art shown in FIG. 6 and the related art shown in FIG. 7.

Thus, the number of steps of removing some of the standard elements 32 previously assembled to the metal ring assemblies 31, 31 and replacing them by the first adjusting elements 32a or the second adjusting elements 32b in order to measure the initial clearance αi, can be suppressed to the minimum. Even if a difference in height level due to a dimensional variation exists between the saddle faces 38, 38 of the first adjusting elements 32a or the second adjusting elements 32b and the saddle faces 38, 38 of the standard elements 32, the influence of the difference in height level adversely affecting the durability of the metal ring assemblies 31, 31 can be suppressed to the minimum by a reduction in the number of elements 32a or 32b. Moreover, since both the first adjusting elements 32a and the second adjusting elements 32b need not be used simultaneously, and only either of them is used, it is possible to prevent the coexistence of the three types of the metal elements 32, 32a and 32b, and the influence of the difference in height level between the saddle faces 38, 38 cannot become large, as compared with the prior art shown in FIG. 6 and the related art shown in FIG. 7.

In this embodiment, the thickness of the standard elements 32, the first adjusting elements 32a and the second adjusting elements 32b is set at 1.5 mm, 1.6 mm and 1.4 mm, respectively, but the specific numerical values may be changed as desired.

In addition, in the embodiment, the initial clearance αi is defined as the threshold value, and if αi<0.8 mm, the first adjusting elements 32a are used, and if αi≧0.8 mm, the second adjusting elements 32b are used. However, one half of the standard thickness t of the standard elements 32, that is 0.75 mm, may be defined as a threshold value, and if αi<0.75 mm, the first adjusting elements 32a may be used, and if αi≧0.75 mm, the second adjusting elements 32b may be used. In this case, eight second adjusting elements 32b are required in a range of 0.75 mm≦αi<0.8 mm, and the number of the adjusting elements required is slightly increased, as compared with seven in the embodiment, but the number of the adjusting elements required can be decreased as a whole.

As discussed above, according to the first feature of the present invention, the first adjusting elements thicker than the standard elements having the standard thickness t by the predetermined value Δt and the second adjusting elements thinner than the standard elements having the standard thickness t by the predetermined value Δt are prepared, a predetermined number of the first adjusting elements or the second adjusting elements are combined among the standard elements, depending on whether the initial clearance αi is smaller than, or equal to or larger than substantially one half of the standard thickness t, thereby suppressing the clearance α between the elements after completion of the assembling to smaller than the predetermined value Δt. Therefore, the number of the adjusting elements required can be reduced to about one half, as compared with a case where only the first adjusting elements or the second adjusting elements are used to achieve the adjustment irrespective of the initial clearance αi.

As a result, it is possible to reduce the number of operating steps for replacing the already assembled standard elements by the adjusting elements after measurement of the initial clearance αi. Moreover, even when a difference in height level exists between saddle faces of the standard element and the adjusting element, a load acting on the metal ring assembly due to the difference in height level can be minimized, to thereby enhance the durability of the belt for the continuously variable transmission.

According to the second feature of the present invention, if $\Delta t \leq \alpha i < (t+\Delta t)/2$, the first adjusting elements are used, or if $(t+\Delta t)/2 \leq \alpha i < t$, the second adjusting elements are used. Therefore, it is possible to minimize the number of the adjusting elements required when the initial clearance αi is approximately one half of the standard thickness t.

Although the embodiment of the present invention has been described in detail, it will be understood that various modifications in design may be made without departing from the subject matter of the present invention.

What is claimed is:

1. A process for assembling a belt for a continuously variable transmission by assembling a large number of metal elements along a metal ring assembly comprised of a plurality of endless metal rings laminated one on another, said process comprising the steps of:

preparing, as the metal elements, standard elements having a standard thickness t, first adjusting elements having a thickness larger than the standard thickness t by a predetermined value Δt, and second adjusting elements having a thickness smaller than the standard thickness t by the predetermined value Δt, assembling only the standard elements closely on the metal ring assembly, and defining, as an initial clearance αi, a clearance α generated between the rearwardmost and forwardmost ones of the standard elements, when the number of the standard elements assembled has reached a maximum, if the initial clearance αi is smaller than approximately one half of said standard thickness t, combining a predetermined number of said first adjusting elements among said standard elements, thereby making the clearance α after completion of the assembling smaller than said predetermined value Δt, or if the initial clearance αi is equal to or larger than approximately one half of said standard thickness t, combining a predetermined number of said second adjusting elements among said standard elements, thereby making the clearance α after completion of the assembling smaller than said predetermined value Δt.

2. A process for assembling a belt for a continuously variable transmission according to claim 1, further comprising if $\Delta t \leq \alpha i < (t+\Delta t)/2$, combining said predetermined number of said first adjusting elements among the standard elements, or if $(t+\Delta t)/2 \leq \alpha i < t$, combining said predetermined number of said second adjusting elements among the standard elements.

* * * * *